H. W. HILL.
OPTICAL LENS.
APPLICATION FILED APR. 4, 1918.
1,362,309.
Patented Dec. 14, 1920.
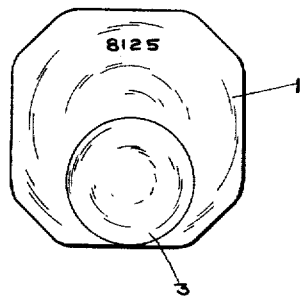
FIG. I.
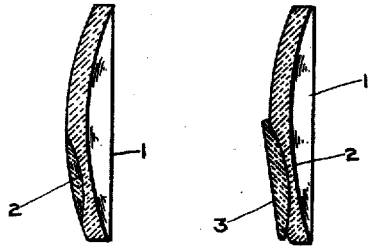
FIG. II.   FIG. III.
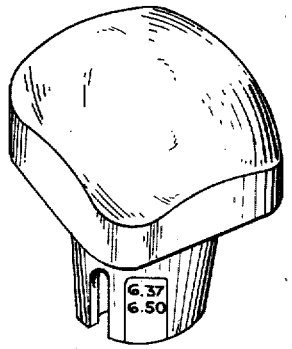
FIG. IV.
| CHART | | | | |
|---|---|---|---|---|
| | 12 | 25 | | |
| 12 | 6 575/587 | 6 562/587 | | |
| 25 | 6 562/575 | 6 550/575 | | |
| 1.50 | 8 637/650 | 8 625/650 | | |
| 3.25 | 10 662/675 | 10 650/675 | | |
| | 50 | 75 | 1.00 | 1.25 |
| 4⁰⁰ | 4050 | 4075 | 4100 | 4125 |
| 6⁰⁰ | 6050 | 6075 | 6100 | 6125 |
| 8⁰⁰ | 8050 | 8075 | 8100 | 8125 |
| 10⁰⁰ | 10050 | 10075 | 10100 | 10125 |
FIG. V.
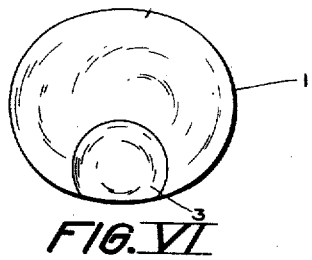
FIG. VI.
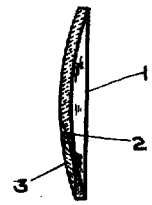
FIG. VII.
INVENTOR
HARRY W. HILL
BY
H. H. Styll   H. K. Parsons
ATTORNEYS

UNITED STATES PATENT OFFICE.

HARRY W. HILL, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPTICAL LENS.

1,362,309.  Specification of Letters Patent.  Patented Dec. 14, 1920.

Application filed April 4, 1918. Serial No. 226,709.

*To all whom it may concern:*

Be it known that I, HARRY W. HILL, a citizen of the United States, residing at Southbridge, in the county of Worcester and State of Massachusetts, have invented certain new and useful Improvements in Optical Lenses, of which the following is a specification.

This invention relates to improvements in lens manufacture and has particular reference to a novel and improved lens series and the process for facilitating the practical commercial production of fused and counterbore two-piece bifocals or similar bifocal lenses in a satisfactory and economical manner.

The principal objects of my invention are to reduce the number of lenses the dealer has to carry in stock; to improve the surface finish quality of the countersink and surface curves; to insure uniform size of the counterbore segments; to provide lenses that require only one blocking by the dealer, thereby reducing the liability of breakage; to increase the capacity of the dealer to handle lenses of this character with a minimum of effort; to eliminate exchanges due to flaws or breakage, which in the course of a year amounts to considerable waste; to enable operators with less technical knowledge to complete and fit bifocals of this character; to insure a better surface on the bifocal side of the finished lens; to give better and quicker service to the patient; to increase the accuracy to which the lenses are ground, that is slighter variations from the desired prescriptive power; and to reduce the prism due to uneven grinding.

A further object of the present invention is the provision of a novel and improved process of forming lenses of this character which will eliminate, so far as the prescription grinder is concerned, the necessity of mathematically calculating or determining the curves to be used on opposite faces of the blank to produce the desired result, together with the attendant confusion in choice of blank to be initially secured.

A further object of the present invention is the provision of an improved process which will render it possible for the prescription grinder to furnish the prescriptions in much less time and with less labor on his part than is now possible and which will at the same time eliminate to a large degree the breakage of lenses by the prescription grinder and the re-grinding sometimes necessary due to the latent defects in the blanks not discoverable until one surface of the same has been ground.

Other objects and advantages of my improved construction should be readily apparent by reference to the following specification taken in connection with the accompanying drawings, and it will be understood that I may make any modifications in the specific details of construction or steps shown and described within the scope of the appended claims without departing from or exceeding the spirit of my invention.

To facilitate an understanding of the features hereinafter referred to I have appended a sheet of drawings illustrative of the same.

Figure I represents a plan view of a suitably designated blank.

Fig. II represents a vertical sectional view therethrough.

Fig. III represents a sectional view of the old form of blank.

Fig. IV represents a perspective view of a grinding tool to be used to form the second face of the blank.

Fig. V represents a view of my improved chart.

Fig. VI represents a plan view of a finished lens.

Fig. VII represents a vertical sectional view therethrough.

Previous to my present invention it has been customary in connection with the sale of fused bifocal lenses, or lenses consisting of a major portion 1 having a countersink 2 formed therein to receive the button or segment 3, to fuse or secure the button within the countersink, with a portion projecting thereabove, as is indicated in Fig. III, and to commercially distribute to the jobber or prescription grinder the blanks so constructed. In the further production of the lenses it is then necessary in order to fill a given prescription to select a blank having the necessary addition, to determine what curves are desired to produce the final prescription, to select properly related tools to produce these curves and to then grind first one and then the other face of the blank to these curves. In those cases where the prescription grinder wishes to be relieved of a certain portion of the work he may order a semi-finished blank from the manufacturer, but in order to procure this blank it is necessary for him to first determine the prescription to be filled, determine the curves he wishes on opposite sides of the lens to produce the necessary prescription, and then request the manufacturer to finish the lens on one side to one of the prescribed curves, this requiring the special grinding of the lens for each particular prescription, and rendering it practically impossible for the prescription man to carry semi-finished lenses in stock.

It has been found in practice in the dispensing of lenses of this kind that to fill all the prescriptions promptly a very large stock of lenses has to be constantly carried by the dealer. To have a complete equipment he would have to carry 247 blanks. As these lenses are of a very expensive nature this represents a very high initial investment and the stock has to be constantly replenished. With my invention this stock may be reduced to 60 numbers, allowing the dealer to carry a much smaller investment and be able to fill his prescriptions not only as quickly but with a better lens than could previously be given. Also both surfaces of the lens had to be finished by the optician, not always under improved conditions that would be met in a factory where lenses can be produced in great quantities. The surfaces, therefore, in the greater majority of cases could not be anywhere near as perfectly formed as they could at a factory, and also their variation from the desired power would fluctuate greatly, as can be readily seen. The dispensing optician would only have a small department with few hands employed and would not have the advantages that a larger plant making lenses on a manufacturing basis would have. Therefore, the surface of the lenses made by the factory are greatly superior and desirable. Also in those cases where the segment is fused into a larger blank very often in cooling there would be internal strains set up in the parts, which strains are not apparent in the blank and only become apparent when the blank is blocked up and the surfacing work done. Oftentimes these internal strains will cause it to crack and fly to pieces. This causes annoyance and loss in the trade, causing delay to the patient as the blank has to be replaced by the manufacturer. Also, it is very difficult for the dispensing grinder to regulate the size of his segments, that is the diameter of the circle of the reading portion. It will be noted that this segment is secured within the countersink in the major blank and as the face is ground down the segment consequently decreases. Therefore, all kinds of variations took place in the size of this segment; oftentimes the size of the left lens would not match the right lens, etc. In factory manufacturing these segments can be standardized and made uniform. Also the dispensing optician had to block up two sides of his lens in grinding, thus doubling his chances of breakage, and also doubling the amount of work he would have to do as compared with the present invention. With a process of this kind he should be able to put out twice as many lenses as he formerly did with the same shop equipment. Also, where the two faces had to be placed on the lens it was necessary for the lens grinder to calculate the curves to which he had to grind the two faces. With my invention by grinding off one side and finishing it all the grinder has to do is to look up his blank number, refer to the chart, take the necessary tool and determine his lenses. All questions of calculations in the hands of inexperienced people are thus automatically eliminated.

Commercially it is an improvement as it enables the factories to give better service to the dealers as they can stock lenses of this kind made on the four bases and carry them in stock, thus giving instant service in filling orders. Scientifically, the lens will be a much more perfect lens as the better and smoother factory grinding will insure freedom from prism due to uneven grinding, will insure better surfaces and standardize the size of segments, etc. The advantages of my invention, therefore, reside in reduction of the stock, saving in labor and a more scientific product as regards its functional requirements.

It is, therefore, one of the principal purposes of my present invention to provide a novel process of manufacturing these lenses, by which it will be possible for the prescription man to carry the semi-finished lenses in stock and grind the curve on the second or plain surface of the lens only when it is desired to make up a particular prescription.

In the past it has been customary to grind an almost innumerable number of different curves on the convex or bifocal face of the lens, and the desired final power of the lens is then determined by the relation of these different curves to various different curves which are ground on the second face of the lens.

By my new process of practically commercially producing these lenses, however, I eliminate the numerous curves which have been in the past applied to the bifocal side, and have by mathematical calculations and by experiments, determined and proved that it is possible to grind a maximum of four different continuous spherical curves on the bifocal side of the original blanks and by a proper choice of convex tools of different curves and powers, said choice meaning the selection of tools whose curves have the proper mathematical relationship to the convex curves on the bifocal side of the lens, to form on the opposite face of the lens concave surfaces which will, in combination with the base curve, produce lenses to fill all prescriptions within normal limits.

It will be understood in the case of lenses such as shown in Figs. II and VI, in which a single continuous curve is ground on the bifocal side and the addition is formed by inserting the button or segment of a different refractive index in the main blank, that it is impossible to mechanically measure or determine the inherent difference in focal value between the main blank and segment and that the only way this can be measured is by neutralization after the back face of the lens has been rendered absolutely clear or transparent. This condition does not exist in the unfinished blank, since the back surface becomes roughened or pitted during the operation of joining the two parts of the bifocal and it is, therefore, necessary to provide some means of indicating this inherent difference in power. To facilitate the work of the prescription grinder, therefore, in the formation of lenses according to my improved process, I have provided my improved chart as shown in Fig. V, having in the upper portion a series of vertical columns divided into horizontal rows, the rows and columns being provided with suitable designations at the top and left hand sides, for instance, as shown in the drawing.

In the drawing I have illustrated but a fragmentary portion of the chart, it being understood that the same is completed for the entire range it is to cover, having been shown at the top as provided with the numerals 12 and 25, designating respectively, one-eighth and one-quarter dioptre power in one meridian, and at the left the numerals .12, .25, 1.50 and 3.25, designating the respective powers designed to be produced in the lenses in the opposite meridian. At the intersections of these several columns it will be noted that there are three distinct figures, the larger figure, as 6, 8 or 10, designating the particular base curve blank which should be selected to produce the desired power, and the two sets of smaller numerals being thus marked on the particular tool which should be selected, as for instance a 6.37, 6.50, as indicated on the tool shown in Fig. IV, which would thus prove the correct tool to produce a +1.50 lens with a −.12 cylinder, when used in connection with the 8 base blank.

It will be understood that in a lens of the character described it is impossible through the use of mechanical machines or the like applied to the surface of the lens, to determine the reading addition or supplemental power in the lens on account of the insert of different index of refraction, and to fill a prescription calling for a particular reading addition it is, therefore, necessary that the manufacturer who knows what the reading addition of the blank is should suitably indicate such addition. To enable the user of the blank to readily determine therefore both its base curve and reading addition, I provide the second chart portion shown at the bottom of Fig. V, having similar columns divided into horizontal rows, the columns being designated at the top with the amount of the reading addition, while at the left are designated the several base curves, the intersection of the columns thus formed containing the designating numeral which will be applied to the blank.

By reference to Fig. V it will be noted that this numeral is made up of an integer indicating the base curve of the blank which forms the first number, then in the weaker powers a cipher or spacing member followed by the power of the addition, while in the higher powers, in which there are three figures in the addition, the number is made up of the base curve and the addition itself, as for example the number 8125 carried by the blank shown in Fig. I, which serves to designate that the blank has an eight finished surface or base curve, with an inserted 1.25 additional power, so that if this particular blank be chosen and ground with the tool in Fig. IV the result will be a lens having a +1.50 correction with a −.12 cylinder in one meridian.

With the foregoing structural elements in mind it will be noted that I have provided a novel and improved process of commercially producing lenses of this type, and particularly of mechanically producing fused bifocal lenses to fit various prescriptions, which process consists in preparing a plurality of major blanks of an index of refraction suitable for distance vision, dividing up these blanks into sets of series and counterboring the blanks of each series to a different ophthalmic curve to give the required prescriptive reading additions from the lowest to the highest numbers, securing within each counterbore and conforming therewith a segment of glass of index of refraction different from that of the counterbored portion and suitable to produce when properly surfaced the desired reading addition, and facing off the united pieces of each set to a continuous ophthalmic surface; that is, the curve shall be continuous through both the major and minor portions of the blank and shall be a constant surface for each unit of any one particular series but each series will have a constant face curve of its own different from that of the other sets. Preferably, I have selected curves of 4 dioptre, 6 dioptre, 8 dioptre and 10 dioptre, as they are found to satisfy the average range of requirements. I next provide a series of tools of either spherical or sphero cylindrical form for grinding the opposite faces of these standard blanks to produce numerous and varied prescriptions, it being understood that each tool may be used with each unit of each set of series whatever the face curve may be, and in this way one tool may be used with several blanks, thus making it possible with a comparatively small number of tools and blanks to fill any prescription within the ordinary range of needs of the eye; that to facilitate the proper forming of these prescriptions and eliminating the necessity of the average workman having to take chances with mathematical determinations of the curves, or the necessity of the prescription grinder himself carefully figuring out the curves necessary to produce the required finished lenses, I have provided a novel and improved chart which serves to indicate to all knowing the power of prescription lens desired the exact tool and exact blank to be employed in connection with the tool, so it is then merely necessary to grind the blank with the tool to reproduce on the concave face of the blank the surface of the tool, when the lens thus produced will be found to have the desired cylindrical or sphere cylindrical power, while the proper selection of the blank in accordance with my improved serial number as applied thereto and formed as indicated by the second portion of the chart will cause the blank to have not only the required cylindrical or sphero cylindrical power, but in addition the necessary reading addition, these results being attained by the non-mathematical workmen who require no knowledge of the higher science of lens curves and formation, but merely the necessary knowledge to read off the correct figures on the charts to enable them to select the prescribed tool and blank to produce a certain specified lens.

I claim:

1. As a manufacture, a set of optical lens blanks comprising a plurality of units, said units being arranged in a plurality of series, each unit of a series comprising a counterbored segment of one refractive index, an insert of another refractive index fitting and secured in the counterbore, the curvature of the counterbore for each unit of a series being different but the curvature of the counterbores for corresponding units of each series being the same, and a face curve on the counterbored face of the blank common both to the insert and the counterbored segment, said face curve being the same for every unit of a series but different for each series.

2. The art of producing a set of semi-finished bifocal blanks to care for the normal range of prescriptions, consisting in establishing a plurality of series, selecting a different arbitrary base curve for each series, forming countersinks in the blanks comprising the set, the countersinks of each base curve series being different in its series but corresponding with those of the other base curve series, securing a segment of a different index of refraction in each of the several countersinks, and forming the arbitrarily selected continuous base curves on the bifocal sides of the entire set.

3. The art of expeditiously producing two part bifocal lens blanks consisting in countersinking a plurality of series of lens blanks the countersinks of each series being different and the countersinks of corresponding units in different series being the same, securing segments of a different index of refraction within the countersinks of each series, and finishing the bifocal surfaces of each series to a single continuous curve, the curves of each series being the same but the curves of different series being unlike.

4. As a manufacture, a set of two part bifocal lens blanks comprising a plurality of series, each series having its two part surface finished in a continuous curve, which curves are different for the different series, and each series having segment receiving countersinks formed in the major portions of the blanks, the countersinks being the same for each series but being progressively different in the series.

In testimony whereof I have affixed my signature, in presence of two witnesses.

HARRY W. HILL.

Witnesses:
H. K. Parsons,
Alice G. Haskell.